US008775231B1

(12) United States Patent
Nipko et al.

(10) Patent No.: US 8,775,231 B1
(45) Date of Patent: Jul. 8, 2014

(54) SYSTEM AND METHOD FOR IDENTIFYING AND PRESENTING BUSINESS-TO-BUSINESS SALES OPPORTUNITIES

(71) Applicant: Zilliant Incorporated, Austin, TX (US)

(72) Inventors: Joseph C. Nipko, Austin, TX (US);
Peter J. Eppele, Austin, TX (US);
Sabarinath Navaneethakrishnan, Austin, TX (US); Jing Zan, Austin, TX (US); Barrett M. Thompson, Fayetteville, GA (US); Eric B. Hills, Austin, TX (US); David D. Kurak, Austin, TX (US)

(73) Assignee: Zilliant Incorporated, Austin, TX (US)

( * ) Notice: Subject to any disclaimer, the term of this patent is extended or adjusted under 35 U.S.C. 154(b) by 0 days.

(21) Appl. No.: 13/765,438

(22) Filed: Feb. 12, 2013

Related U.S. Application Data

(63) Continuation of application No. 13/626,782, filed on Sep. 25, 2012.

(51) Int. Cl.
*G06Q 10/00* (2012.01)
*G06Q 30/02* (2012.01)

(52) U.S. Cl.
CPC ............................. *G06Q 30/0204* (2013.01)
USPC ........................................................ 705/7.33

(58) Field of Classification Search
USPC ............................................... 705/7.27, 7.33
See application file for complete search history.

(56) References Cited

U.S. PATENT DOCUMENTS

| | | | |
|---|---|---|---|
| 7,630,986 B1 * | 12/2009 | Herz et al. ............................. | 1/1 |
| 2002/0069101 A1 * | 6/2002 | Vincent ............................ | 705/10 |
| 2007/0094067 A1 * | 4/2007 | Kumar et al. .................... | 705/10 |
| 2008/0270398 A1 * | 10/2008 | Landau et al. .................... | 707/6 |
| 2009/0254971 A1 * | 10/2009 | Herz et al. ......................... | 726/1 |
| 2012/0066065 A1 * | 3/2012 | Switzer ....................... | 705/14.53 |

OTHER PUBLICATIONS

Catalyst: Customer discrimination as strategy. Business Line. Nov. 8, 2007.*
Zilliant Releases Margin Insight 7.0 for Identifying margin leaks & Prioritizing Pricing Opportunities. PRLog—Global Press Release Distribution. Nov. 9, 2009.*
United Rentals Inc. Deploys Zilliant Solutions to Enhance Pricing Operations Across Branch Network. PRWeb. Sep. 1, 2010.*
"United Rentals Inc. Deploys Zilliant Solutions to Enhance Pricing Operations Across Branch Network" dated Sep. 1, 2010.*

* cited by examiner

*Primary Examiner* — Johnna Loftis
(74) *Attorney, Agent, or Firm* — Taylor Russell & Russell, P.C.

(57) ABSTRACT

The present invention relates to a system and method for efficiently identifying the sales opportunities in a business-to-business market environment. It provides a computer-implemented predictive sales intelligence system and method for identifying sales opportunities. The present invention is a computer implemented system and method for efficiently identifying reliable purchase pattern profiles through scientific analysis of customer data. It includes a system and method for calculating a customer's purchase profile, clustering customers based on similarity of their purchase profile, and efficiently providing a reliable set of opportunities including lost sales (retention) and cross-selling (wallet share expansion) opportunities. It uses this reliable estimate of sales opportunities to retain and expand wallet share for customers.

20 Claims, 22 Drawing Sheets

Overall Representation

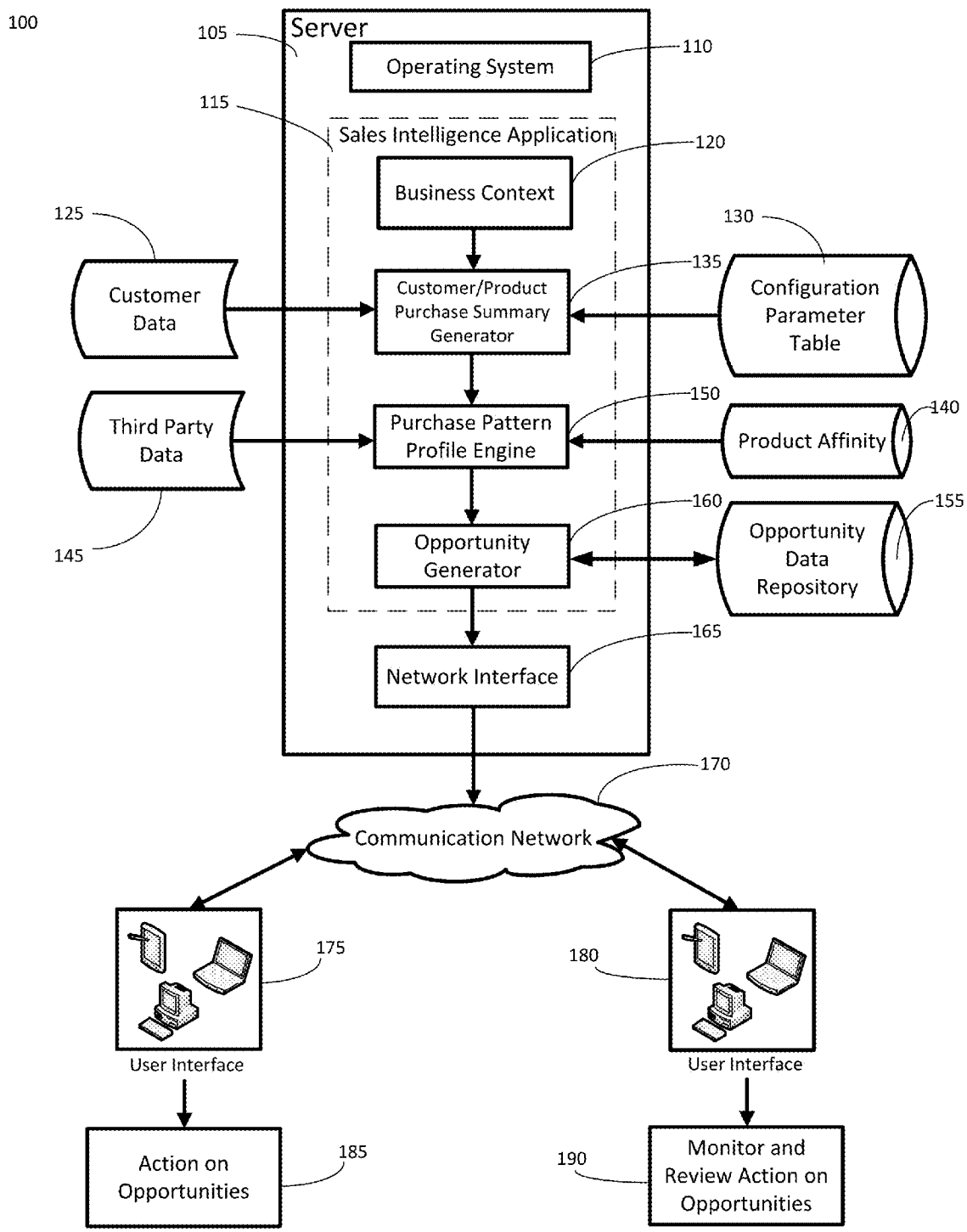
Fig. 1 Overall Representation

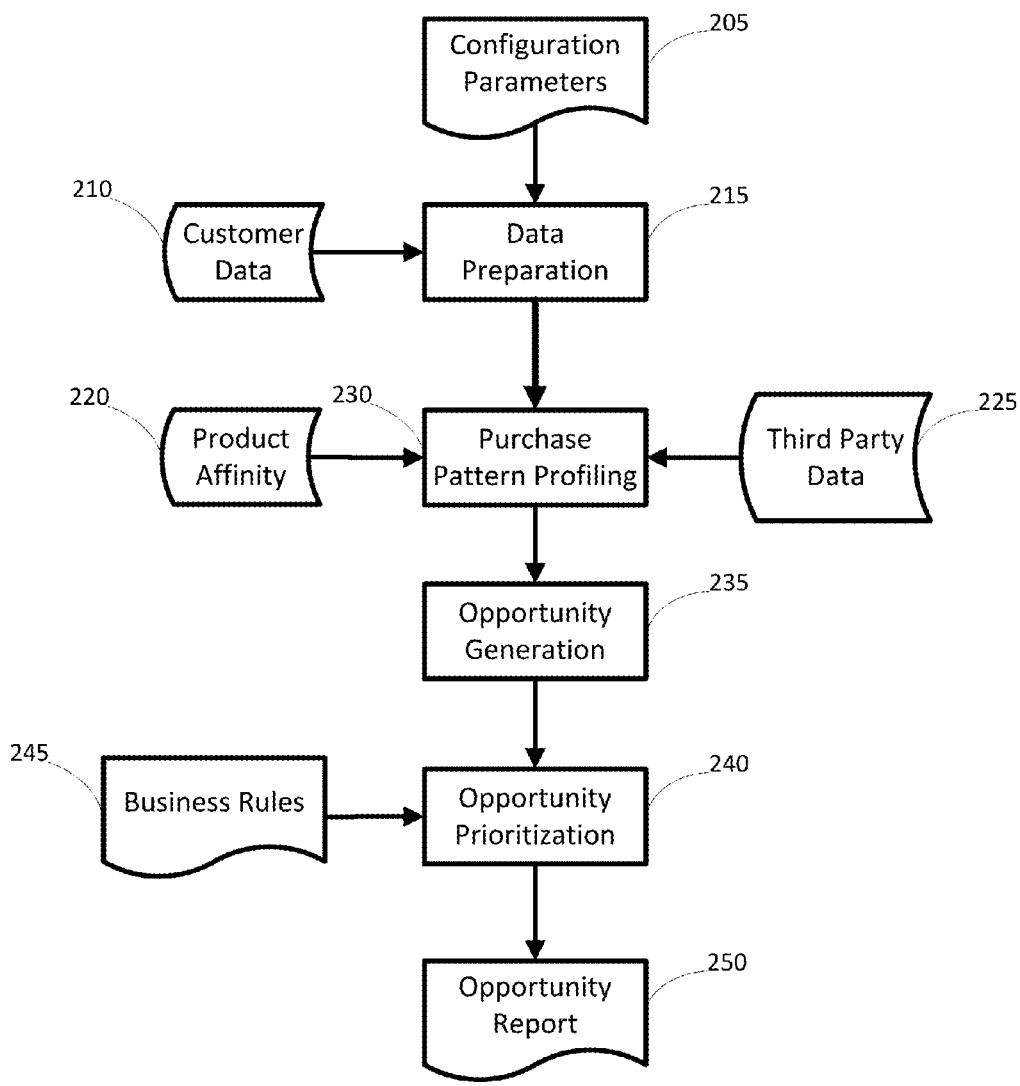
Fig. 2 Functional Block Diagram

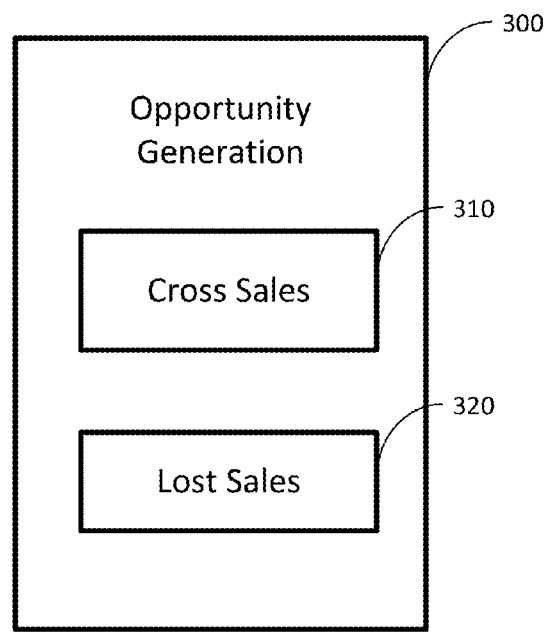
Fig. 3 Opportunity Generation

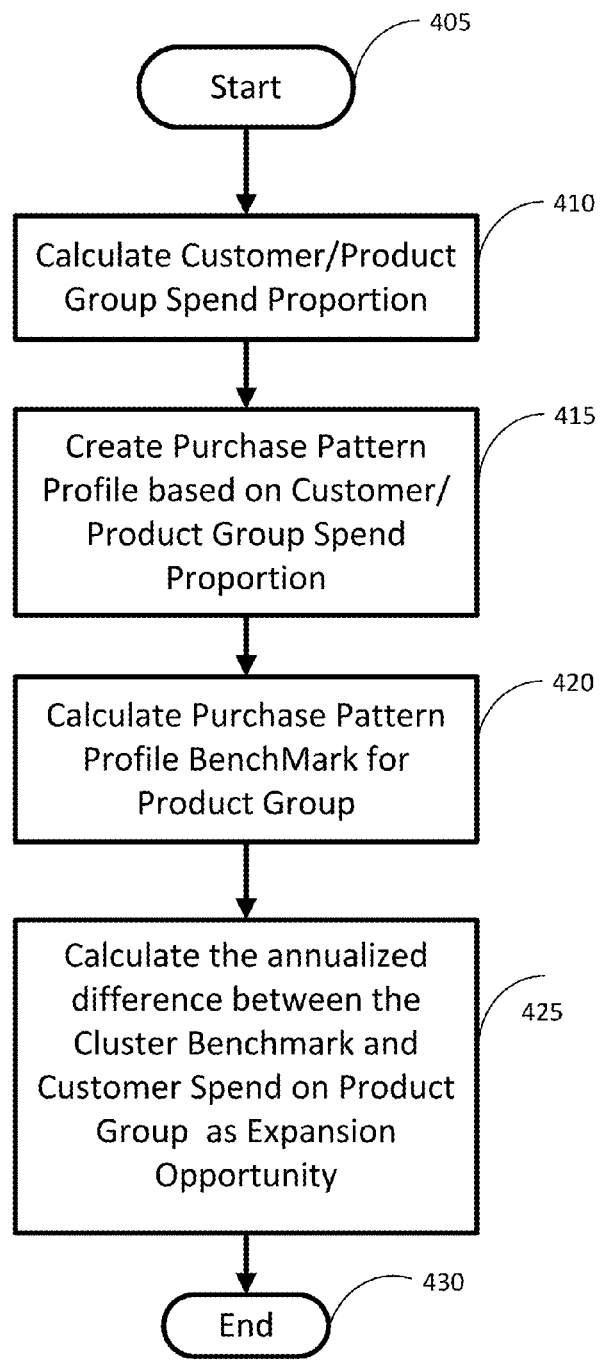
Fig. 4 Cross Sell Identification

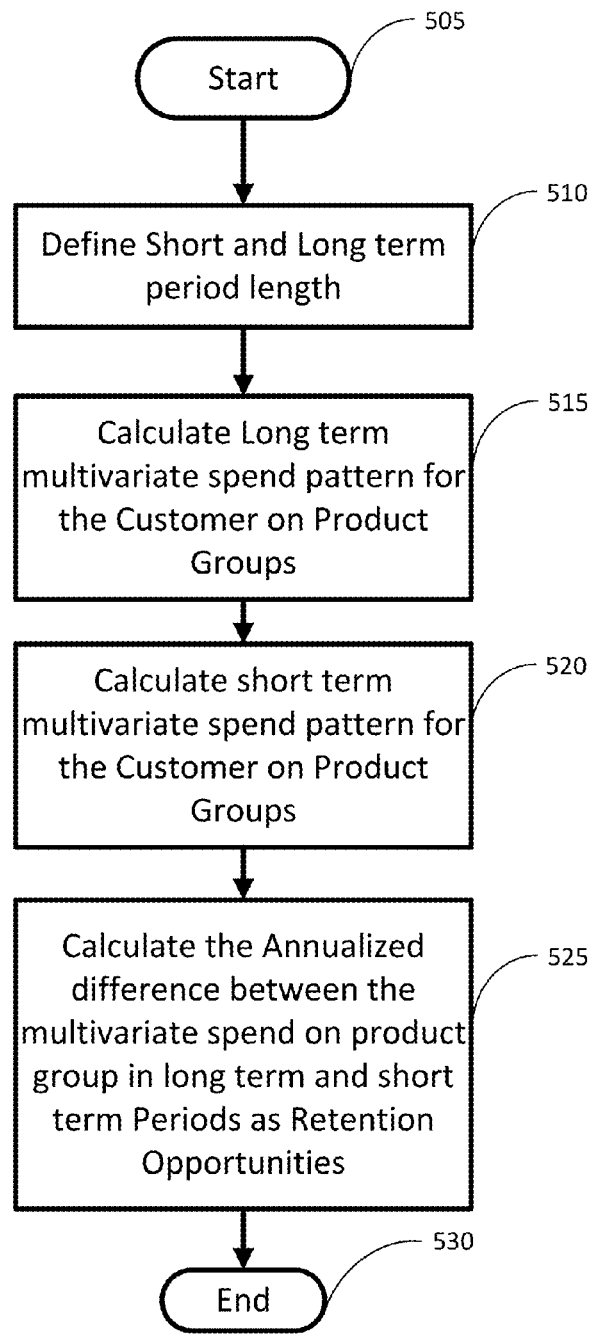
Fig. 5 Lost Sales Identification

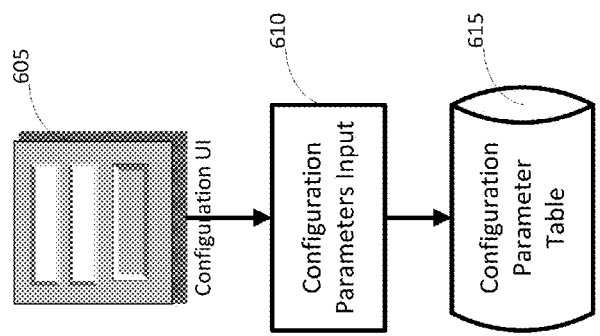
Fig. 6 Configuration UI

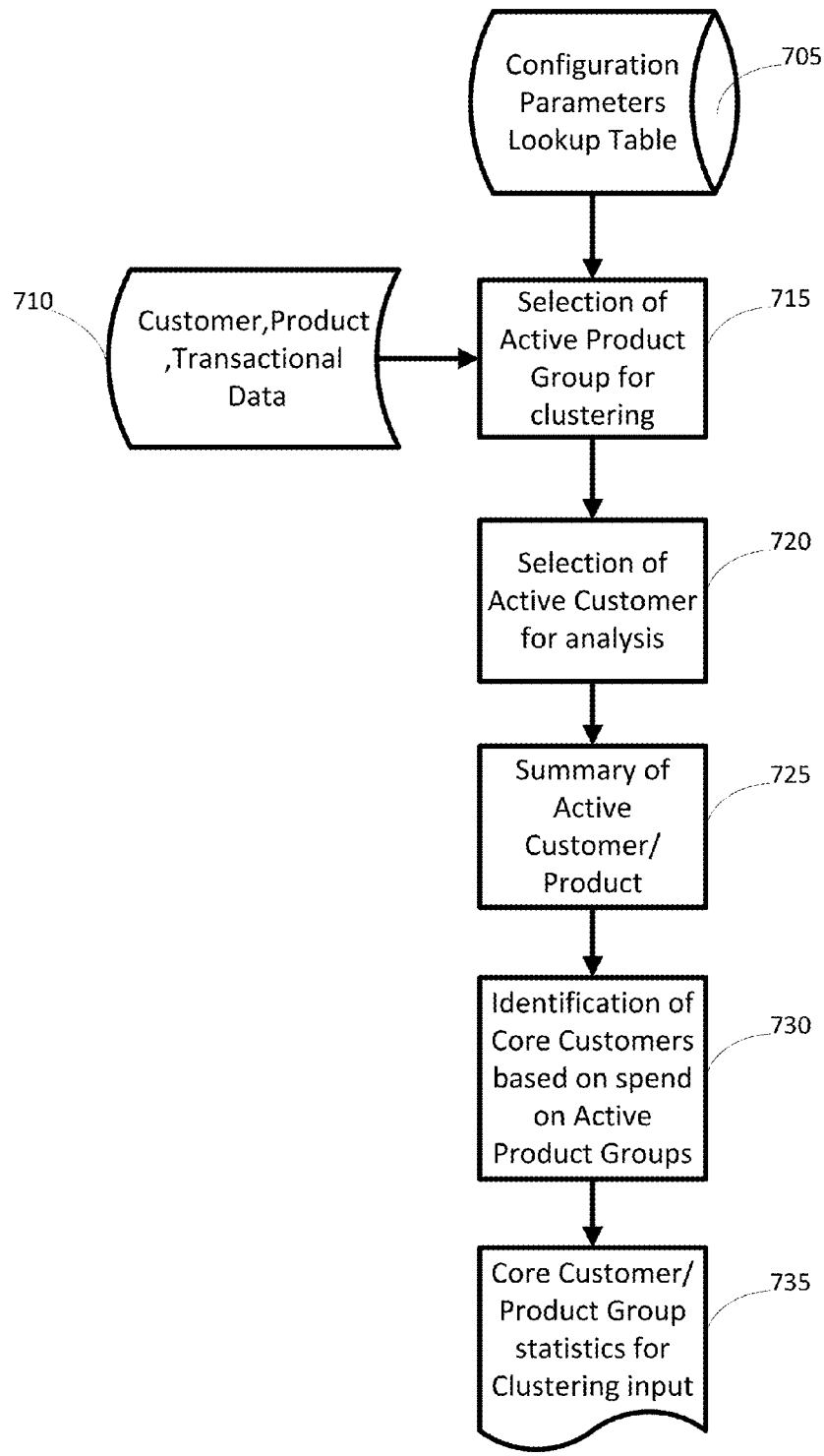
Fig. 7 Data Preparation

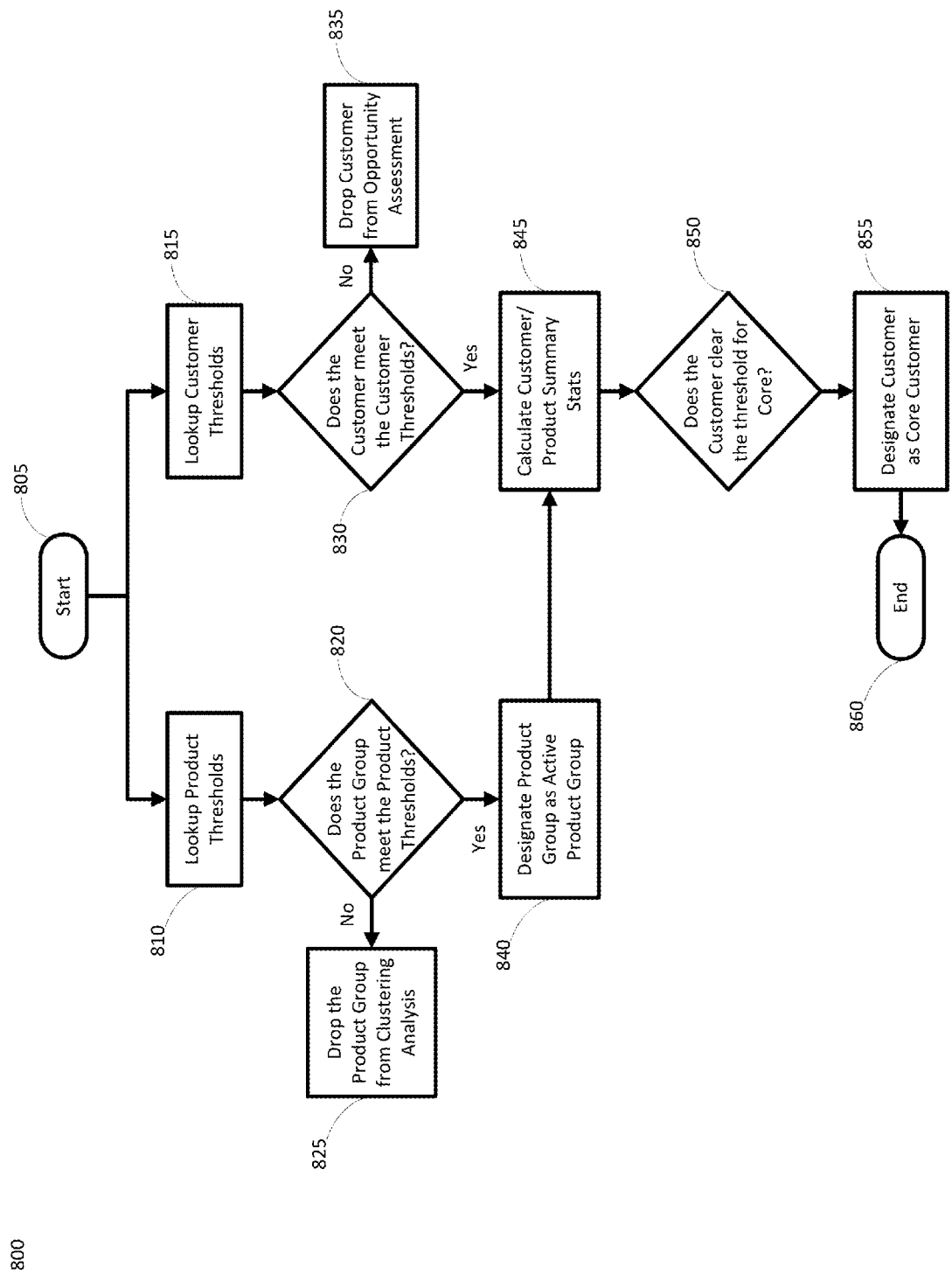
Fig. 8 Data Preparation Flow Chart

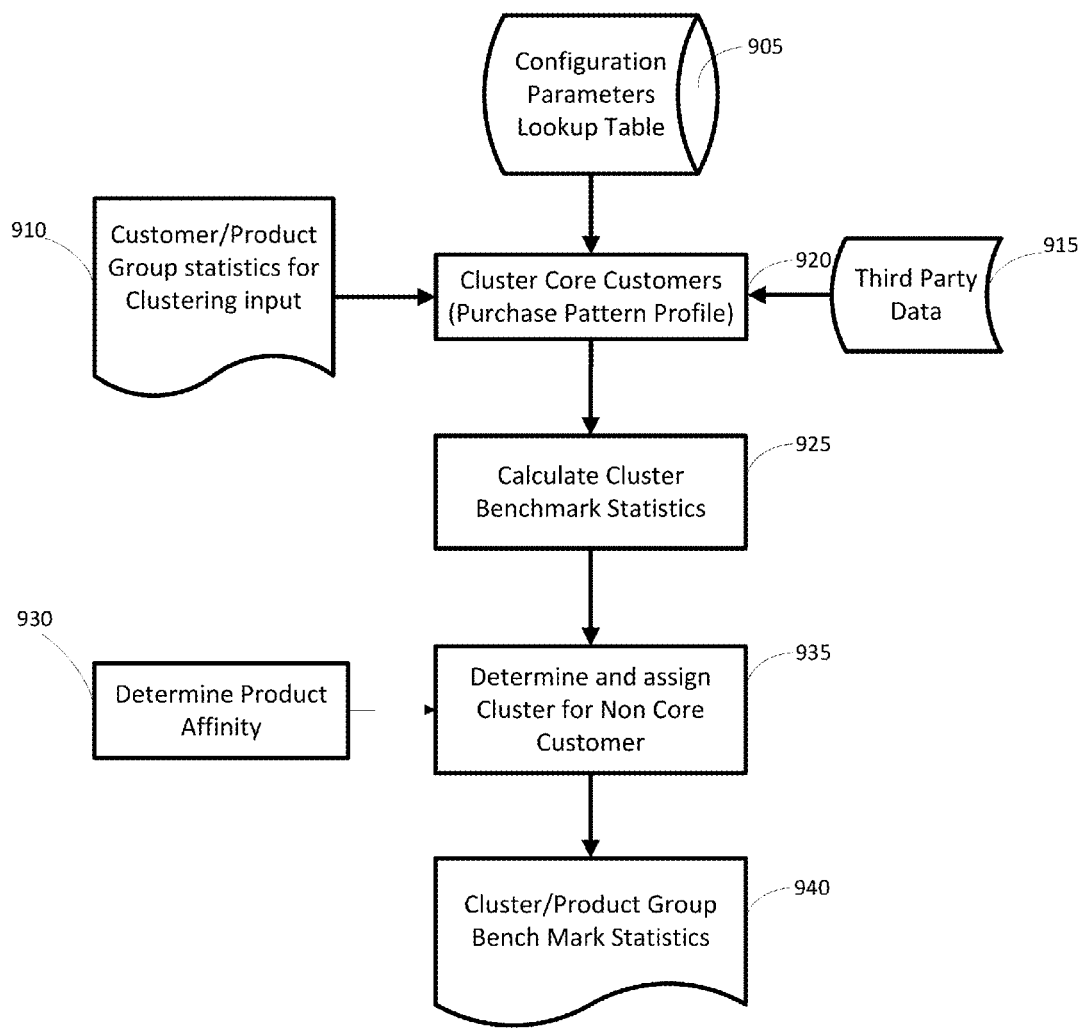
Fig. 9 Clustering

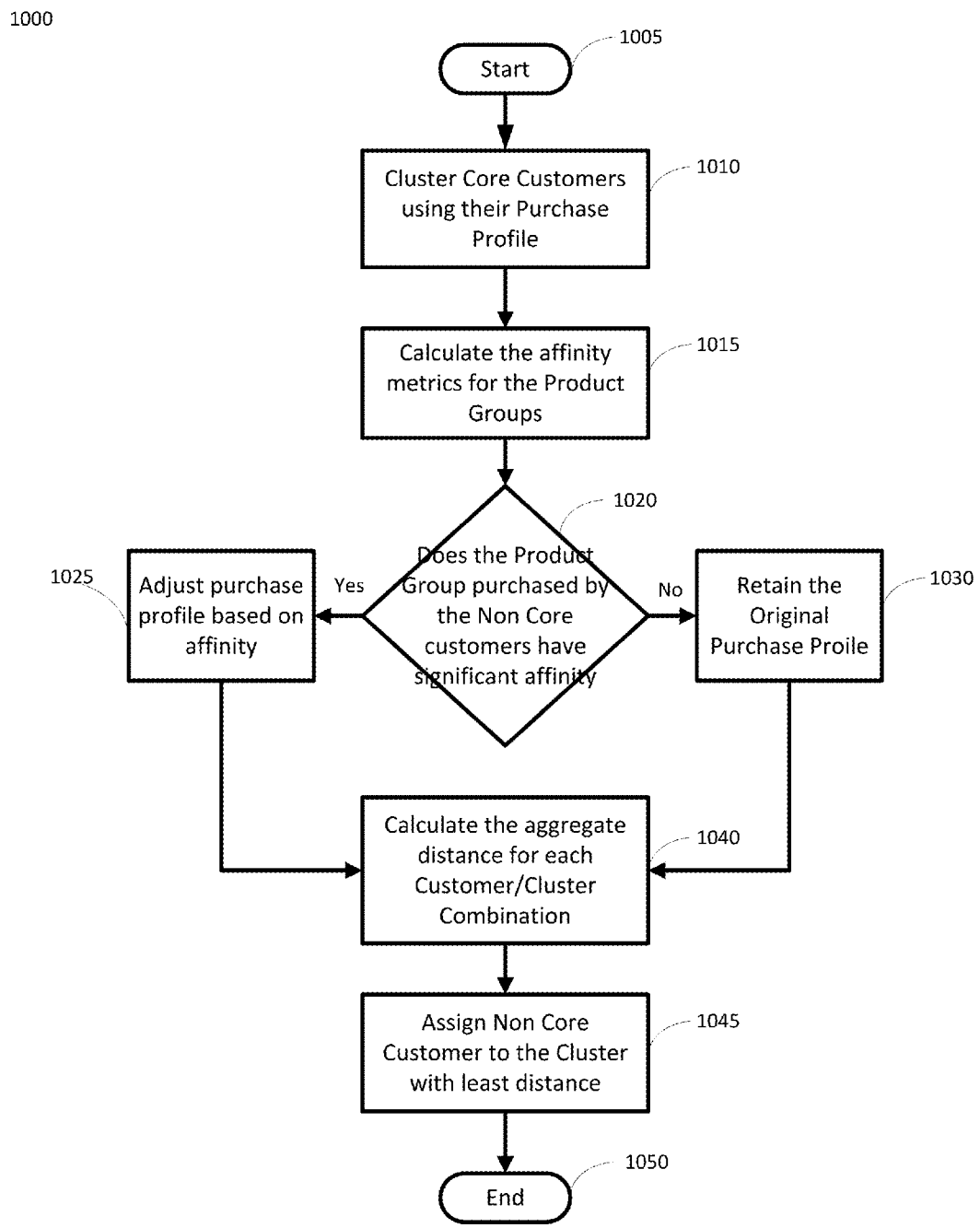
Fig. 10 Clustering Flow Chart

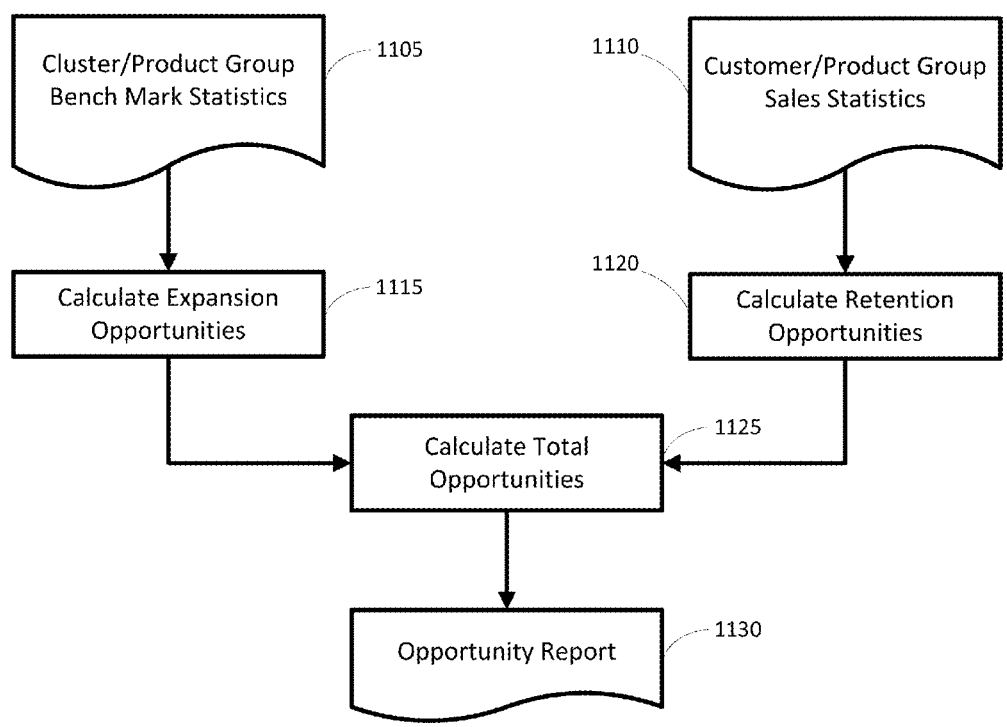
Fig. 11 Opportunity Generation

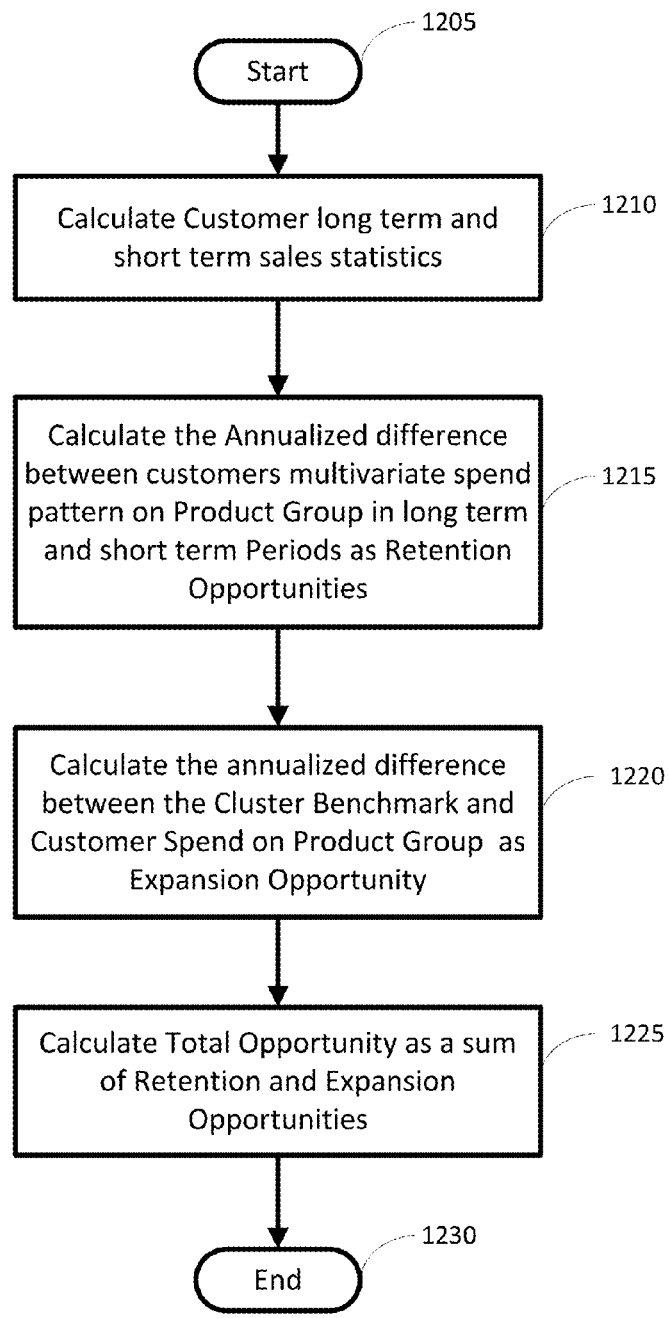
Fig. 12 Opportunity Generation Flow Chart

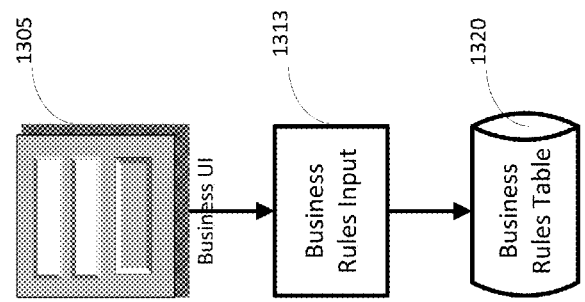
Fig. 13 Business Rules UI

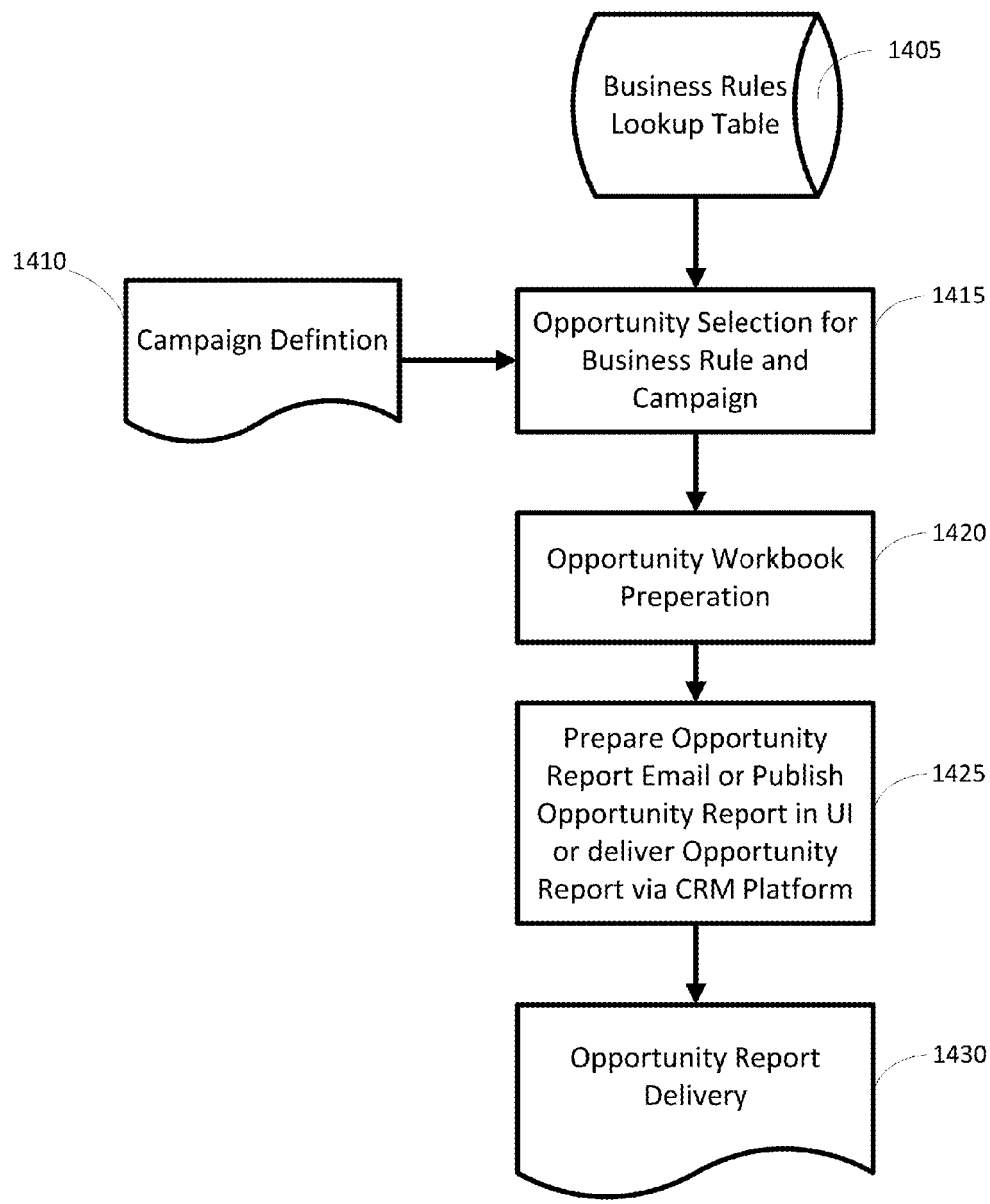
Fig. 14 Sales Campaign

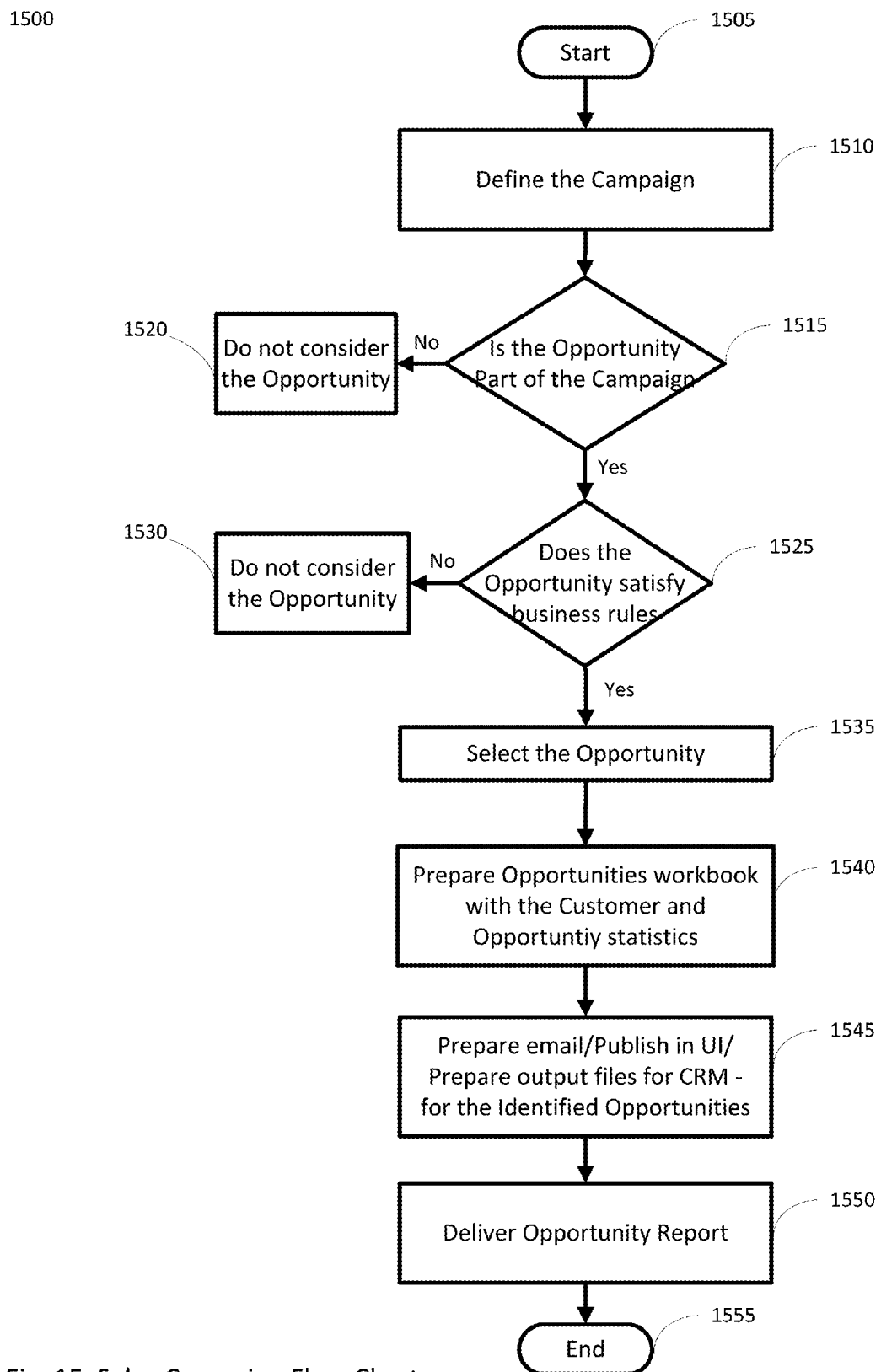
Fig. 15 Sales Campaign Flow Chart

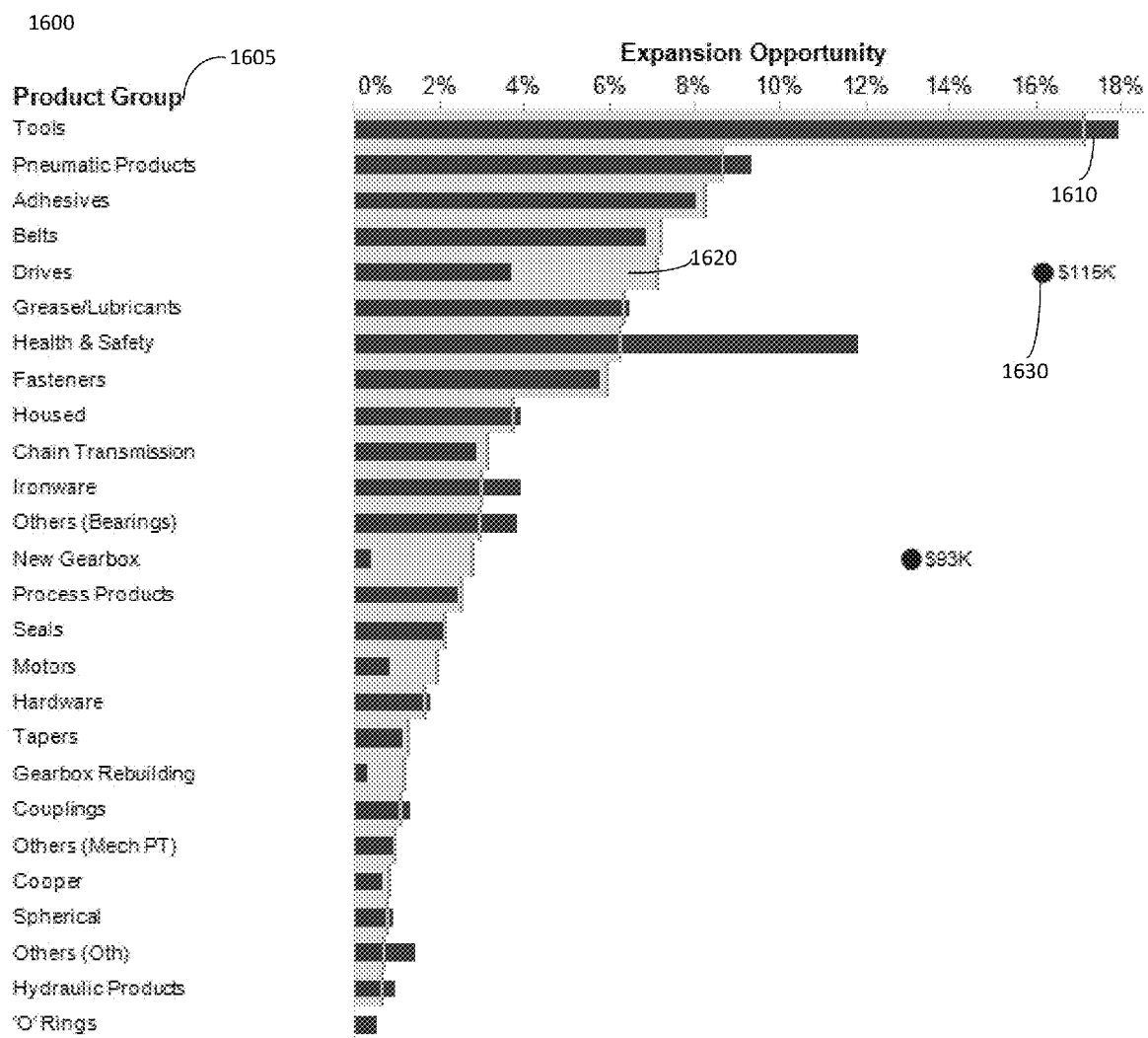
Fig. 16 a Wallet Share Expansion Opportunities

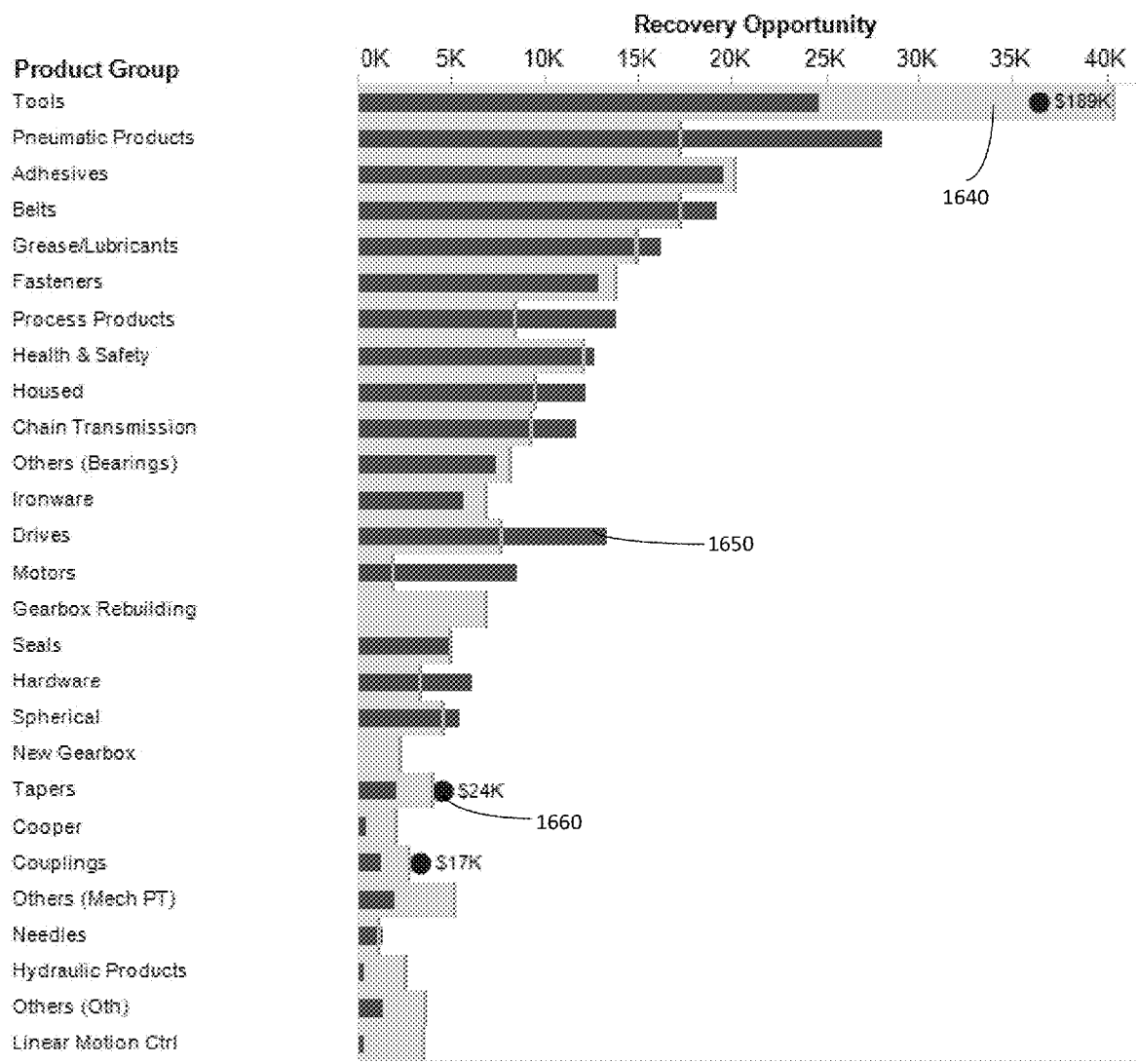
Fig. 16 b Customer Retention Opportunities

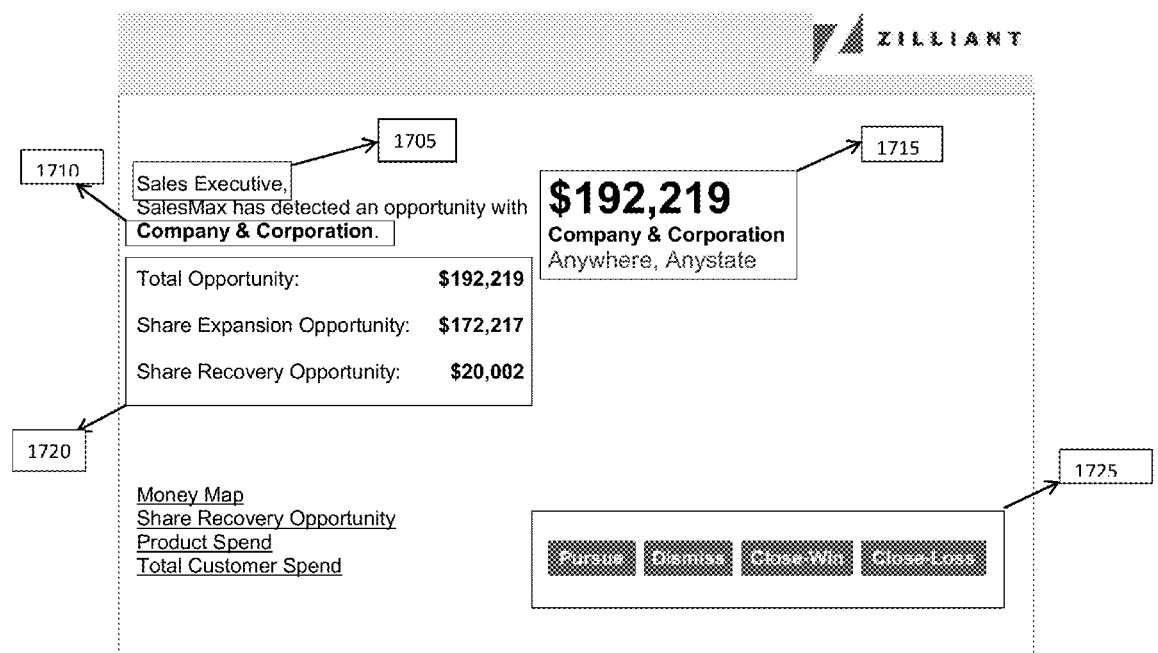
Fig. 17 Email Template

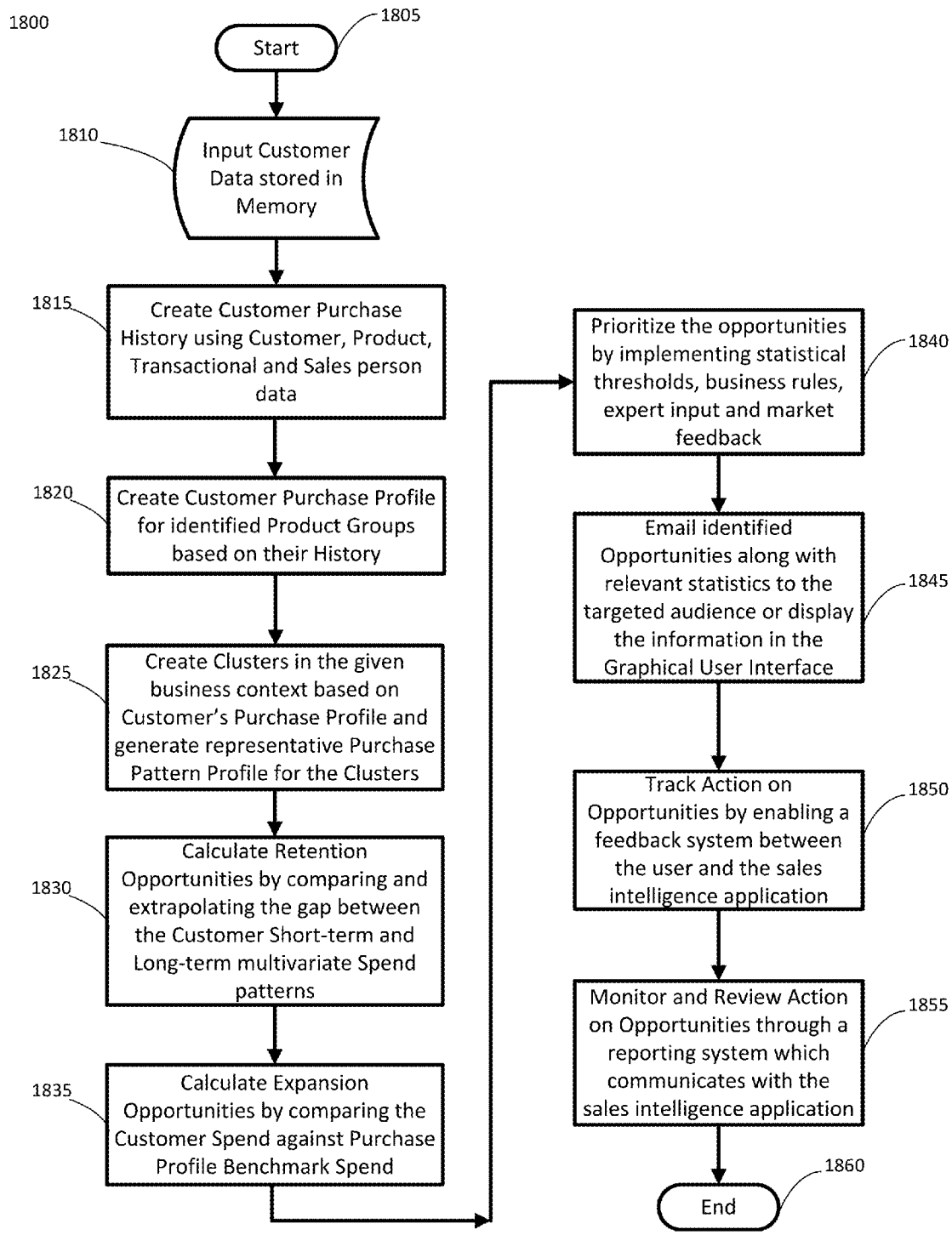
Fig. 18 Methodology

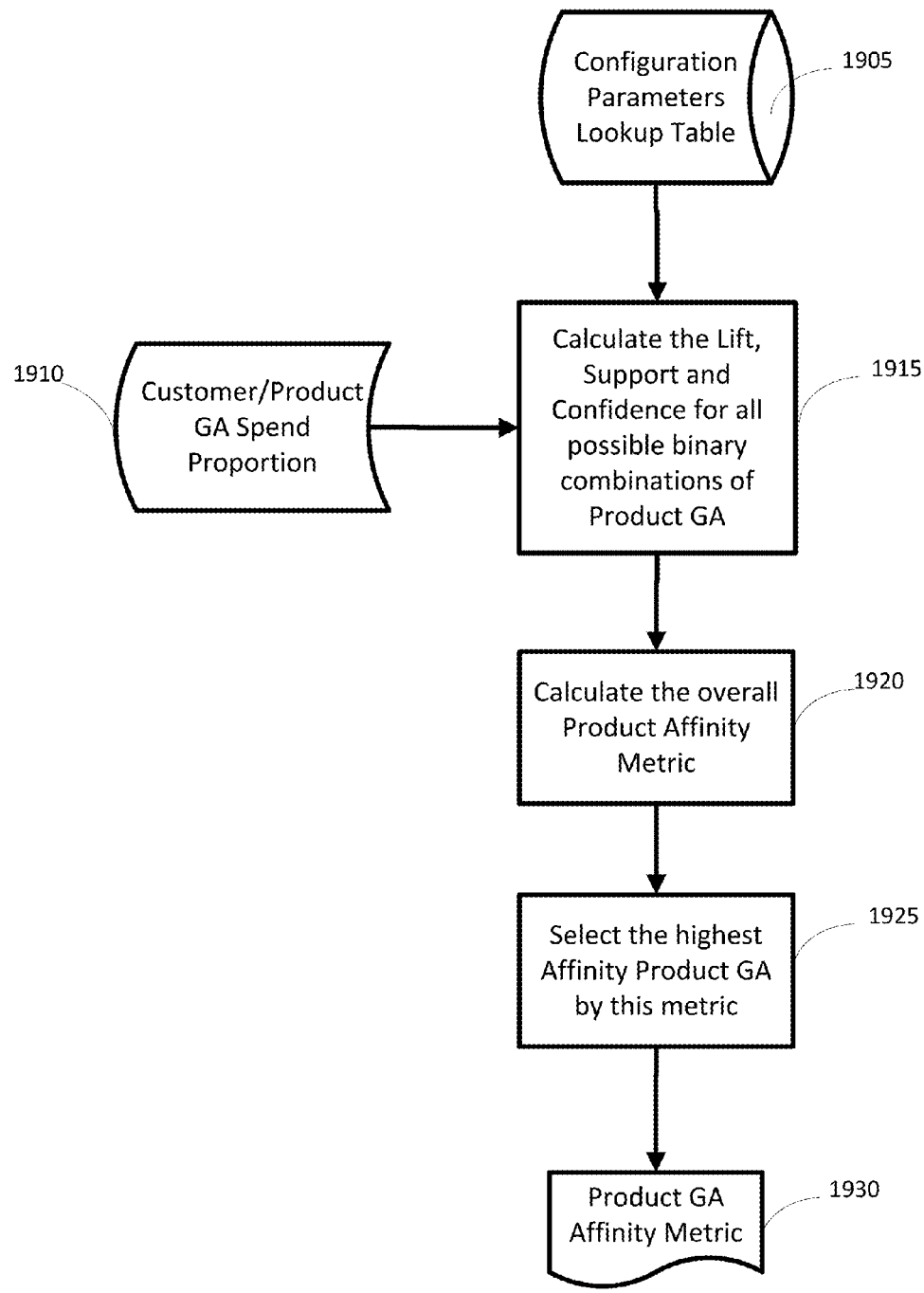
Fig. 19 Product Affinity

2000
Purchase Pattern Profile 2005
Customer Recent Purchase Pattern 2010
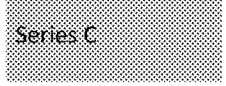
Fig. 20a Wallet Share Expansion Customer Recent Purchase Pattern 2035
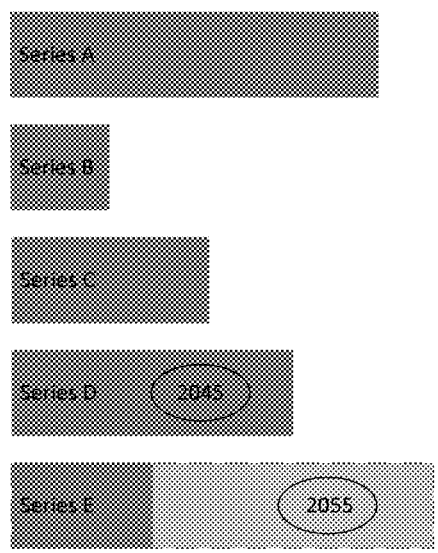
Customer Former Purchase Pattern 2040
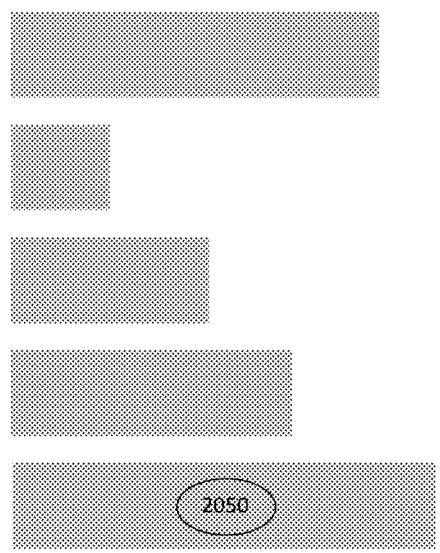
Fig. 20b Customer Retention

SYSTEM AND METHOD FOR IDENTIFYING AND PRESENTING BUSINESS-TO-BUSINESS SALES OPPORTUNITIES

BACKGROUND

Business-to-business (B2B) companies spend significant time and resources to retain existing customers and expand wallet share within those existing customers. In their marketing, sales, maintenance and support and other interactions with customers, businesses create, gather and store large volumes of business transaction data such as company's line level transaction history—each and every customer order, product by product, and account by account, that is captured and stored over some period of time. With the advances in data storage and data mining technologies as well as customer relationship management technologies, businesses increasingly seek to use this often voluminous business transaction data for the purposes of retaining and expanding wallet share within existing customers. Businesses know that business transaction data holds a wealth of knowledge and insight. Yet most companies are challenged to consistently and systematically transform that data into an actionable form that drives measurable business results because traditional analytical and reporting methods lack the required statistical and predictive rigor to product high quality customer retention and wallet share expansion insights.

To extract significant value, the business must be able to find customer retention and wallet share expansion insights in their business transaction data beyond what they can observe with the naked eye. For example, the business likely knows how much each of their best customers spends with them. They may even know how much the customers spend in each product category and if that spend changes over time. But they are not likely to know which products their customers are willing and able to buy from them, but are buying elsewhere (wallet share expansion opportunity) or which customers are starting to defect to their competitors (retention opportunity) which results in lost sales for the business.

Identifying wallet share expansion opportunity requires the ability to predict what customers are not buying, but could be buying from the business and in what quantities. Business transaction data can reveal wallet share expansion opportunities, just not in its raw form. The data needs to be processed, analyzed and presented in the right way for the business to see the opportunities. This is done by intelligently grouping customers with common purchase behavior across a range of products and product groups through rigorous analysis using advanced statistical techniques. The resulting customer groups are used to generate purchase pattern profiles, which enable businesses to spot opportunities that are not visible in simple statistical analysis.

Identifying customer retention opportunity requires the ability to quickly detect significant deviations in customer purchase patterns. Business transaction data can be used to reveal retention opportunities; however the business transaction data in its raw form doesn't reveal these opportunities. The data needs to be processed, analyzed and presented in the right way for the business to see the opportunities. A more sophisticated level of rigor and scientific accuracy is needed to transform the data into actionable purchase patterns. Customer retention opportunities are identified by establishing a profile of normal customer purchase behavior, across products and product groups, during a baseline period and detecting significant deviations during an evaluation period. The definition of normal customer purchase behavior is multivariate, considering frequency, size and regularity of purchase.

This kind of insight can help businesses plan sales, marketing and product strategies to boost revenue including:
1. Growth through Cross-Selling
2. Identification of Lost Sales
3. Preempting Customer Defection and Churn
4. Data-Driven Territory Planning
5. Moving Inventory
6. Recognizing Sales Upticks
7. New Product Introduction

SUMMARY

Accordingly the current invention automatically identifies actionable sales opportunities across products and product groups for each customer and delivers the high value opportunities directly to salespeople in the field using a simple, novel presentation format.

The present invention relates to a system and method for efficiently identifying the sales opportunities in a business-to-business market environment. It provides a computer-implemented predictive sales intelligence system and method for identifying sales opportunities. More particularly, the present invention is a computer implemented system and method for efficiently identifying reliable purchase pattern profiles through scientific analysis of customer data. It includes a system and method for calculating a customer's purchase profile, clustering customers based on similarity of their purchase profile, and efficiently providing a reliable set of opportunities including lost sales (retention) and cross-selling (wallet share expansion) opportunities. It uses this reliable estimate of sales opportunities to retain and expand wallet share with existing customers.

The present method uses affinity propagation clustering algorithms to group customers with similar purchase behavior. Although other types of clustering algorithms may be used such as, centroid models, hierarchical clustering, and graph search algorithms, there are drawbacks to those algorithms. For example, K-type algorithms are heuristic centroid model algorithms in which there is no guarantee that the algorithm will converge to a global optimum, and the results may depend on the initial clusters. As the algorithm is usually very fast, it is common to run it multiple times with different starting conditions. However, in the worst case, k-means can be very slow to converge: in particular it has been shown that there exist certain point sets, even in 2 dimensions, on which k-means takes exponential time, that is $2^{\Omega(n)}$, to converge. Also, k-means algorithms require a priori knowledge of the number of expected clusters. Fuzzy c-means clustering algorithms allow objects to belong to more than one cluster which doesn't satisfy the requirements for this specific invention.

The particular embodiment of the affinity propagation clustering algorithm in the present invention lends itself to an efficient method and system for defining the purchase pattern profiles. The advantage of affinity propagation is that the algorithm the algorithm creates an ideal number of clusters based on the data without requiring a priori knowledge or estimation of the expected number of clusters. Also affinity propagation can handle a non-symmetric similarity matrix which most other algorithms cannot. Customer clusters identified through the affinity propagation clustering algorithm are used to create purchase pattern profiles which can then be used in the opportunity generation to identify cross-sell (wallet share expansion) opportunities.

Further, the computer implemented system described in the present invention addresses computational inefficiencies in using traditional statistical analysis to detect opportunities. More specifically, the present invention uses a robust and efficient method to detect customer attrition, defined as situations where customers are reducing spend with the company beyond expected levels. In addition, the method uses statistical thresholds and provides a methodology for using the thresholds, business rules and expert input to improve the reliability of the identified lost sales (customer retention) opportunities.

The present invention comprises a computer-implemented method for determining sales opportunities. The method is implemented by computer-executable instructions being executed by a computer processor. Sales transactional data stored in memory along with customer and product data is inputted. The sales transaction data comprises sales transactions for a business. Purchase pattern profiles that group customers with similar purchase profile are computed by clustering the customers based on the similarity of their purchase profile. Within each algorithmically identified customer cluster, purchase pattern profiles are identified by computing a set of benchmark spend proportions across products or product groups. The benchmark spend proportions represent the expected purchase levels (wallet share) of customers within the given purchase pattern profile. Reliable wallet expansion and customer retention opportunities (cross-sales and lost sales) are calculated for each customer/product combination based on differences from the purchase pattern profile benchmark. The opportunities are quantified and prioritized using statistical thresholds, business rules, expert input and market feedback and the opportunities are displayed to the user in a simple, novel presentation format.

An embodiment of the present invention comprises a computer-implemented method for identifying product cross sell opportunities for a target customer, the method implemented by computer-executable instructions being executed by a computer processor. It comprises the steps of: inputting target customer data attributes and target product data for a target customer stored in memory; inputting sales transaction data for the target customer stored in memory for one or more products, the sales transaction data comprising historical sales transactions for the target customer; inputting customer data attributes, product data, product affinity data and sales transaction data for a group of core customers; clustering a set of core customers into a clustered customer group whereby the customers in the clustered customer group have similar customer data selected from the group consisting of: customer data attributes, product data, product affinity data and sales transaction data; using the clustered customer groups, computing a benchmark spending model by product for the core customers within the group to determine a purchase pattern profile representative of the clustered customer group; computing a benchmark spending model by product for a non-core customer to determine a non-core customer purchase pattern profile based on data selected from the group consisting of: customer data attributes, product data, product affinity data and sales transaction data; normalizing the non-core customer purchase pattern profile, selecting a relevant clustered customer group with a purchase pattern profile that is the closest match to the non-core customer purchase pattern profile and adding the non-core customer to the selected relevant clustered customer group; and using the clustered customer group purchase pattern profile and the target customer data attributes, target product data, and target sales transaction data, computing cross sell opportunities for the target customer.

An embodiment of the present invention comprises a computer-implemented method for identifying product customer retention opportunities for a target customer, the method implemented by computer-executable instructions being executed by a computer processor. It comprises the steps of: inputting target customer data attributes and target product data for a target customer stored in memory; inputting sales transaction data for the target customer stored in memory for one or more products, the sales transaction data comprising historical sales transactions for the target customer; inputting customer data attributes, product data, product affinity data and sales transaction data for a group of core customers; clustering a set of core customers into clustered customer groups whereby the customers in the clustered customer group have similar customer data selected from the group consisting of: customer data attributes, product data, product affinity data and sales transaction data; using the clustered customer groups, computing a benchmark spending model by product for the core customers within the group to determine a purchase pattern profile representative of the clustered customer group; normalizing a multivariate spend pattern for the noncore, core and target customers for an evaluation period to compute a purchase pattern profile of the clustered customer group to interpret changes in customer spend pattern; calculating a multivariate spend pattern of the target customer for a baseline period and the evaluation period by product; using the calculated multivariate spend pattern of the customer for baseline and evaluation periods by product and the target customer data attributes, target product data, and target sales transaction data, computing customer retention opportunities for the target customer. The opportunity generator function further comprises computer instructions for generating an opportunity report that visually depicts cross sell or customer retention opportunities. The computer instructions comprise computer code for: identifying normalized benchmark non-core customer and core customer spending for the product group as expected non-target spending for the product group; identifying target customer spending for the product group; calculating target customer cross sell or customer retention opportunity amounts for the target customer; displaying the product group, normalized benchmark noncore customer and core customer spending for the product group, the target customer spending for the product group and the target customer cross sell or customer retention opportunities for baseline and evaluation periods for the product group; and repeating the identifying normalized benchmark noncore customer and core customer spending, identifying target customer spending, calculating target customer cross sell or customer retention opportunity amounts for the target customer. The display comprises a plurality of bars representing normalized expected non-target spending for the product group, target customer spending for the product group and cross sell or customer retention opportunity amounts for the target customer. The cross sell opportunities are identified as the difference between an expected percentage spend for the target customer calculated from the normalized expected non-target customer spending calculated and the actual percent spending for the target customer. The customer retention opportunities are identified as the difference between a multivariate spend for the target customer calculated for the baseline period and a multivariate spend for the target customer for the evaluation period.

BRIEF DESCRIPTION OF DRAWINGS

These and other features, aspects and advantages of the present invention will become better understood with regard to the following description, appended claims, and accompanying drawings wherein:

FIG. 1 depicts a computer system and network suitable for implementing the system for generating, delivering and maintaining sales opportunities.

FIG. 2 is a functional block diagram illustrating a computer implemented system and method for determining sales opportunities.

FIG. 3 is a functional block diagram for illustrating the opportunity generation function.

FIG. 4 is a flow diagram of illustrating the wallet share expansion (cross sales) identification function.

FIG. 5 is a flow diagram of illustrating the customer retention (lost sales) identification function.

FIG. 6 depicts a functional block diagram for generating a configuration parameter lookup table.

FIG. 7 depicts a functional block diagram for data preparation process.

FIG. 8 is a flow diagram illustrating the process of data preparation for purchase pattern profile analysis.

FIG. 9 depicts a functional block diagram for the purchase pattern profiling process.

FIG. 10 is a flow diagram of the process of creating clusters and assigning customers to purchase pattern profiles.

FIG. 11 depicts a functional block diagram for the opportunity generation process.

FIG. 12 is a flow diagram that shows how Expansion Opportunities and Total Opportunities are calculated.

FIG. 13 depicts a functional block diagram for generating a Business Rules lookup table.

FIG. 14 depicts a functional block diagram for identifying opportunities by applying Business Rules and generating opportunity report for delivery.

FIG. 15 is a flow diagram that shows how opportunities are identified and opportunity reports are generated for delivery.

FIG. 16a depicts an exemplary user interface that visually represents customer retention (lost sales) opportunities identified by the present computer implemented system and method for determining sales opportunities.

FIG. 16b depicts an exemplary user interface that visually represents wallet share expansion (cross sales) opportunities identified by the present computer implemented system and method for determining sales opportunities.

FIG. 17 depicts an exemplary output of the response system that may be built into the emails sent to sales personnel.

FIG. 18 is a flow diagram of an exemplary embodiment of the method for generating, delivering and maintaining sales intelligence.

FIG. 19 depicts a functional block diagram to calculate product affinity.

FIG. 20a is an exemplary depiction of a visualization of the output of the wallet share expansion (cross sales) opportunities function.

FIG. 20b is an exemplary depiction of a visualization of the output of the customer retention (lost sales) opportunities function.

DETAILED DESCRIPTION OF INVENTION

FIG. 1 depicts a computer system and network 100 suitable for implementing the system and method for generating and delivering opportunities. A server computer 105 includes an operating system 110 for controlling the overall operation of the server 105, which connects to user interface devices 175, 180 via a server/network interface 165 and a communication network 170. A software-implemented sales intelligence application 115 resides in the server 105 and accesses customer data 125 from data storage devices to create a Customer/Product purchase summary 135 for use by a Purchase Pattern Profile (clustering) engine 150. The Purchase Pattern Profile engine also receives product affinity information 140 and third party data 145 from the storage devices. An opportunity generator 160 receives data from the Purchase Pattern Profile engine 150, may store opportunities in an opportunity data repository 155 and communicates the opportunities to user interface devices 175, 180 via a network interface 165 and a communication network 170.

FIG. 2 is a functional block diagram illustrating an embodiment of a computer implemented system and method for determining sales opportunities 200. Customer data 210, product affinity information 220 and third party data 225 which could include product data, sales transaction data, industry profile data, economic data and public and private census data are used to perform Purchase Pattern Profiling (clustering) 230 whereby each profile for a group of customers is defined by a collection of product attributes, customer attributes and a business context like region or business unit if it is required. When there is no context the clustering algorithm will consider all the customers as one group for clustering analysis and will create generic clusters but if a context is introduced then the clustering algorithm will consider the customers within each context as separate groups and create clusters within the context. For example, if clustering is performed for all the customers in the country without a context then the resulting clusters are applicable for all parts of the country but "State" is added as a context then the resulting clusters will be unique to each state. Each profile includes a unique purchase pattern which is then input into the opportunity generator 235 where it is used to determine opportunities for a customer. The opportunity generator 235 generates different types of opportunities such as customer retention (lost sales) and wallet share expansion (cross sales) opportunities. The opportunity prioritization function 240 uses business rules 245, which may be input by a user either via user interface or as input data from a database of business rules that have been previously compiled, to prioritized opportunities and identify opportunities that are to be included in the opportunity report 250.

FIG. 3 is a functional block diagram illustrating an embodiment of the opportunity generation function. The opportunity generation process 300 involves determining Cross Sales 310 and Lost Sales 320 Opportunities. The input to this process is the customer/product summary and the cluster output information and the output of this process is the cross sales and lost sales opportunity data.

FIG. 4 is a flow diagram of illustrating an embodiment of the cross sell identification function 400. The cross sell identification function compares the expected percent spend in the purchase pattern profile and actual percent spend in customers recent purchase pattern and identify the cross sell opportunity 1730 where there is a positive difference between the two. The cross sell identification process 400 begins 405 and involves calculating the customer/product summary 410 and creating a Purchase Pattern Profile 415 for the customers based on the amount of money the customer spends on various product groups. The benchmark statistics for the Purchase Pattern Profile 420 are calculated which are then used to calculate the cross sell opportunity as the annualized difference between customer's spend on a product group and the Purchase Pattern Profile (cluster) benchmark spend for the product group 425 and processing ends 430.

FIG. 5 is a flow diagram of illustrating an embodiment of the lost sales identification function 500. The lost sales identification function compares the actual percent spend in customers former purchase pattern and actual percent spend in customers recent purchase pattern and identifies the lost sales opportunities where there is a positive difference between the two. The lost sales identification process 500 begins 505 by determining the short (Evaluation) and long (Baseline) term period over which the lost sales will be identified 510. For example, the short term period could be the current year and the long term period could encompass any amount of time over which the user wants to evaluate the previous amount of money the customer spends. Then the long term 515 and the short term 520 multivariate spend patterns that the customer spends, that is the amount of money the customer spends on various on products and product groups, the frequency of product and product group spending and the regularity of such spending are calculated. The lost sales (retention) opportunities are calculated as the annualized difference between customers multivariate spend during the long term period and the customers multivariate spend on the short term period 525 and processing ends 530.

FIG. 6 is a functional block diagram illustrating an embodiment of a system and method 600 for construction a configuration parameter lookup table 615 used to store the parameters for data preparation and Purchase Pattern Profiling process. Although there are many ways of constructing a parameter lookup table such as through a user interface or inputting a previously created data file, the particular embodiment shown in FIG. 3 comprises constructing the parameter lookup table using a configuration user interface 605. In this particular embodiment, the user inputs configuration parameters 610 into the configuration use interface 605 which are stored in the configuration parameter table 615. The parameter lookup table includes the input necessary for data modeling and clustering. The parameters that are used for data modeling and Purchase Pattern Profiling are:
 a. Minimum Revenue and Product Group Parameters
 b. Date and Time Period Parameters
 c. Customer Definition Parameters
The parameters that are used to identify opportunities are:
 d. Minimum Opportunity Amount Parameters
 e. Opportunity Definition Parameters
The parameters that are used to define a campaign are:
 f. Campaign Definition Parameters FIG. 7 depicts a functional block diagram illustrating an embodiment of the data preparation process 700 wherein a customer/product summary generator relies upon a pre-generated configuration parameter lookup table 705. Customer, product and transactional data 710 are retained in data storage and are used by the customer/product summary generator. The customer/product summary generator uses the parameters from the configuration parameters lookup table 705 to perform analysis on the products data to determine which product groups 715 should be considered for the analysis and also performs similar analysis on the customer data to determine the active customers 720 for the analysis. The summary of all possible active customer/product 725 is calculated using the active customer, active product and transactional data. The core customers 730, who can be considered as the ideal customers based on the diversity of product groups they buy and the amount of money they spend buying those products, are identified using the spend parameter from configuration parameter lookup table 705. The customer/product summary, which usually contains customer, product and customer's percent spend on the specified Product, for core customers 435 is calculated and is to be used as input to the Purchase Pattern Profiling (clustering) process.

FIG. 8 is a flow diagram illustrating an embodiment of the process of data preparation for Purchase Pattern Profile (clustering) analysis and represents the customer/product summary generation process 800. The summary statistics calculated for product groups and customers are evaluated against product thresholds 820 and customer thresholds 830. The product 810 and customer 815 thresholds are input from the parameter lookup table. If any product group 825 or customer 835 does not meet the threshold, then they are not included in the analysis. The product groups that meet the thresholds are designated as active product group 840 and the summary of active product groups for all the customers who meet the customer thresholds are calculated 845. The customers who clear 850 the core customer thresholds are then designated as core customers 855 and processing ends 860.

FIG. 9 is a functional block diagram illustrating an embodiment of the Purchase Pattern Profiling (clustering) function 900. A purchase pattern profile engine 920 takes input data from the pre-generated configuration parameter lookup table 905. The customer/product group statistics 910 for core customers and third party data 915 are also used as input for the Purchase Pattern Profiling process. The Purchase Pattern Profiling process uses an affinity propagation algorithm which is a clustering algorithm that uses the input data to determine a representative customer (exemplary) purchase profile against which like customers can be grouped and compared. The Purchase Pattern Profiling engine 920 uses the parameters from the configuration parameters lookup table 905 to determine if there is a need to introduce a context within which the profiles should be created. If there is a need add context to the profiling process then the Purchase Pattern Profiling will be done within each context. Once the Purchase Pattern Profiles are created 920, which represent expected customer spend for a customer within the group across a set of products or product groups, the profile benchmark statistics 925 are calculated by using the customer/product spend proportion for the Core Customers. The affinity relationship among product that provides the probability of products being purchased together for the product groups 930 is calculated using a technique such as affinity analysis and is used in determining the Purchase Pattern Profile for non-core customers. Non-core customers are customers who do not fit the profile of an ideal customer as defined by the user 935. The Purchase Pattern Profiles for non-core customers 930 are determined based on the customer/product spend proportion normalized for product affinity rather than actual customer/product spend Proportion of the non-core customers. Once the Purchase Pattern profile is calculated then the Cluster/Product Group Benchmark Statistics along with the Customer/Cluster information is output 940.

FIG. 10 is a flow diagram representing an embodiment of the Purchase Pattern Profile process 1000. The core customers 1010 using their purchase profile are clustered to create Purchase Pattern Profiles that are representative of the different customer groups based on their purchase patterns. Various clustering techniques such as affinity propagation, centroid models, hierarchical clustering, and graph search algorithms are employed to create the Purchase Pattern Profiles. The affinity relationship between the product groups 1015 being analyzed is calculated using known methods like market basket analysis. The purchase profile of the non-core customer is adjusted 1025 based on the level of affinity between product groups in the Purchase Pattern Profile that were purchased by the non-core customer 1020. If the level of affinity does not meet a certain threshold that is determined by the user, the original purchase profile is retained and not adjusted 1030. The aggregate distance for each non-core customer/Purchase Pattern Profile combination is calculated 1040 and the non-core customer is assigned to the Purchase Pattern Profile with least aggregate distance 1045 and processing ends 1050.

FIG. 11 is a functional block diagram illustrating an embodiment of the opportunity generation process 1100. Cluster and product group bench mark statistics 1105 are used to calculate expansion opportunities. The opportunities are calculated using customer/product group summary statistics 1110 and Purchase Pattern Profile/product group benchmark statistics 1105 as inputs. We calculate expansion opportunities 1115 and retention opportunities 1120 and the total opportunities 1125 are calculated as a sum of these two types of opportunities. The opportunity report 1130 contains the opportunity information (expansion and retention opportunities) for all the customer/product combinations that meet or exceed the thresholds set by the user.

FIG. 12 is a flow diagram that shows an embodiment of how expansion opportunities and total opportunities are calculated and represents the opportunity generation process 1200. The process begins 1205 and the long term and short term sales statistics 1210 for the combination of all active customers and all the product groups purchased by those customers are calculated. The retention opportunities 1215 are calculated as the annualized difference between customers multivariate spend on a product group in long term (Baseline) and short term (Evaluation) periods. The difference between Purchase Pattern Profile benchmark for a product group and the proportional spend for the customer on that product group is used to calculate the annualized expansion opportunity 1220. The total opportunity 1225 for the customer is calculated as a sum of all positive retention and expansion opportunities.

FIG. 13 is a functional block diagram illustrating one embodiment of a system and method 1300 for construction a business rules lookup table 1320 to store the business rules that are used to prioritize the opportunities for delivery. Although there are many ways of constructing a business rules lookup table, the particular embodiment shown in FIG. 13 comprises a configuration user interface 1305. In this particular embodiment the user inputs the business rules 1313 such as minimum recovery opportunity amount, minimum expansion opportunity amount, minimum total opportunity amount, minimum share gap and the like which are stored in the business rules lookup table 1320.

FIG. 14 is a functional block diagram illustrating the process of identifying opportunities 1400 for a sales and marketing campaign defined 1410 by the user based on their current business plan. The business rules stored in the business rules lookup table combined with the campaign information are used to select the appropriate opportunities 1415. Once the opportunities are identified an opportunity workbook 1420 is prepared that shows the computed opportunities resulting from the present method with views that are part of the email sent to the sales people and also to validate the clusters and opportunities. An example of an opportunity workbook view is shown in FIG. 18. The opportunity reports for the identified opportunities are then prepared to be delivered via email or through a user interface or a CRM platform 1425 and the reports are then delivered 1430.

FIG. 15 is a flow diagram representing the process of identifying opportunities and generating opportunity reports for delivery 1500. The campaign information defined by the user 1510 is used to define whether an opportunity is part of the campaign 1515 and the business rules input by the user are used to determine if the opportunity satisfies the business rule 1525. If the opportunity satisfies both the conditions, then the opportunity will be considered 1525, 1535 and if not the opportunity will not be considered 1520, 1530. The opportunities workbook is created using the identified opportunities (considered opportunities) and customer information 1540. The opportunity workbook will have customer information such as total revenue, revenue by product group, revenue over time etc. An opportunity report is prepared for each customer and then the report is used to generate an email or published via a user interface or created us output files to be uploaded to a CRM system 1545. The opportunity report is delivered via one of these communication network channels 1550.

FIG. 16a depicts an exemplary user interface that visually represents customer expansion (cross sell) opportunities identified by the present computer implemented system and method for determining sales opportunities. The image of the opportunity report, also known as a money map shows the identified opportunities for a customer by product group 1605 along with the customer purchase information for each product group. In this embodiment, the customer expansion (cross sell) opportunities report shows that in the product group "Tools" 1610, the customer is already purchasing more than the benchmark group of customers. The product group "Drives" 1620 shows that there is a customer expansion opportunity of $115K 1630 when the customer's current drive purchases are compared to the purchases by the benchmark group of customers. It also contains the Purchase Pattern Profile benchmark metric for each product group as well.

FIG. 16b depicts an exemplary user interface that visually represents wallet share retention (lost sales) opportunities identified by the present computer implemented system and method for determining sales opportunities. In this embodiment, the retention (lost sales) opportunities report shows that in the product group "Tools", there is an retention opportunity of $189K 1640 when the customer's short term (Evaluation) purchase pattern is compared with long term (Baseline) purchase pattern of the customer in Tools. In the product group Drives 1650 no retention opportunities are shown since the customer's short term purchase pattern is higher than the long term purchase pattern. The product group "Tapers" shows retention opportunity of $24K 1660 when the customer's current (Evaluation) taper purchases are compared to the taper purchases they made in baseline period.

FIG. 17 is depicts an exemplary output of the response system that may be built into the emails sent to sales personal and represents an image of the opportunity email that is sent to the sales person. The email is addressed to each sales person individually 1705. The email contains the information about the customer 1710, the total opportunity 1715, expansion and retention opportunities 1720 and the built in response mechanism 1725. The sales person is given the option to pursue, dismiss and to inform a win or loss (meaning that the sale has been closed or lost).

FIG. 18 is a flow diagram of an exemplary embodiment of the method for generating, delivering and maintaining sales intelligence and depicts an exemplary embodiment of the method for determining predictive sales opportunities 1800. The method is implemented by computer-executable instructions being executed by a computer processor. At the start 1801, customer data stored in memory is inputted in 1810. The customer data comprises customer, product, transactional and sales organization for a business. Using the data customer purchase history 1818 and then customer purchase profiles for identified product groups are created 1820. The Purchase Pattern Profiling engine creates and assigns customers to the profile that is representative of the customer's purchase profile 1825. The retention opportunities for each customer are calculated by extrapolating the gap between customer's long term and short term multivariate spend pattern for a given product group 1830. Similarly expansion opportunity is calculated by extrapolating the gap between the Purchase Pattern Profile benchmark spend proportion and customer's proportional spend on a product group 1835. The calculated opportunities are prioritized using a set of business rules, statistical threshold, expert input and market feedback 1840. The identified opportunities along with the relevant information is emailed or displayed in a user interface or packaged to be used in a CRM system 1845. A feedback mechanism is built in each of the communication channels to facilitate the tracking the actions taken on the opportunities recommended 1850. All the responses to the opportunities are then monitored and reviewed using a reporting system which communicates with the predictive sales application 1855 and processing ends 1860.

FIG. 19 is a functional block diagram illustrating an embodiment of the product affinity estimation 1900 which represents the likelihood that one product will be purchased when another product is purchased by the same customer. The product affinity calculation relies upon the pre-generated configuration parameter lookup table 1905 and customer/product purchase summary 1910. The lift metric which represents the strength of association of the two products being evaluated for affinity, the support metric which indicates how often the two products are purchased together and the confidence metric which is the conditional probability that one product is purchased given that the other product is also purchased for all possible binary combinations of product groups are calculated 1915. The overall product affinity 1920 is a function of the calculated lift, support and confidence metric 1915. The affinity information is output 1930 by selecting the product group combinations with highest overall product affinity metric 1625.

FIG. 20*a* is an exemplary depiction of a visualization of the output of the wallet share expansion (cross sales) opportunities function. It shows the process of cross sell identification by comparing the expected percent spend 2020 in the Purchase Pattern Profile 2005 and actual percent spend 2025 in customers recent purchase pattern 2010 and identifying the cross sell opportunity where there is a positive difference between the two 2030.

FIG. 20*b* is an exemplary depiction of a visualization of the output of the customer retention (lost sales) opportunities function. It shows the process of lost sale identification by comparing actual percent spend 2050 in customers former purchase pattern 2040 and actual percent spend 2045 in customers recent purchase pattern 2035 and identifying the lost sale opportunity where there is a positive difference between the two 2055.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the present invention has been described in detail with reference to certain preferred embodiments, it should be apparent that modifications and adaptations to those embodiments might occur to persons skilled in the art without departing from the spirit and scope of the present invention.

The invention claimed is:

1. A computer-implemented method hosted on a server for identifying product cross sell opportunities for a target customer to be presented to a business, comprising carrying out the steps of the method by computer-executable instructions being executed by the server with at least a computer processor and a memory, comprising the computer-implemented steps of:

downloading target customer data attributes and target product data for a target customer stored in memory into the server;

downloading target customer sales transaction data comprising historical sales transactions for the target customer stored in the memory for one or more products into the server;

downloading customer data stored in the memory for a group of core customers into the server wherein the customer data is selected from the group consisting of core customer data attributes, core customer product data, core customer product affinity data and core customer sales transaction data;

computing a clustered customer group with a clustering algorithm by grouping together customers from the group of core customers that have similar product purchase patterns to form a clustered customer group and correlating spending by product for core customers within the clustered customer group;

computing a benchmark spending model by product for the core customers within the clustered customer group to determine a clustered customer group product purchase pattern profile;

downloading non-core customer data stored in the memory for a group of non-core customers into the server wherein the non-core customer data is selected from the group consisting of non-core customer data attributes, non-core customer product data and non-core customer sales transaction data;

computing a non-core customer spending model by product for a non-core customer using the non-core customer data downloaded into the server to determine a non-core customer product purchase pattern profile;

normalizing the non-core customer product purchase pattern profile by computing an expected non-core customer product spending based on the clustered customer group product purchase pattern profile, and adding the normalized non-core customer product purchase pattern profile to the clustered customer group product purchase pattern profile;

determining the differences between the clustered customer group product purchase pattern profile and the target customer sales transaction data to generate product cross-sell opportunities for the target customer; and presenting the product cross-sell opportunities for the target customer to the business.

2. The method of claim 1 further comprising the computer-implemented steps of:

downloading business rules stored in a database into the server;

applying an opportunity generator function to the cross sell opportunities for the target customer wherein the opportunity generator function uses business rules to identify the product cross sell opportunities for the target customer.

3. The method of claim 2 further comprising the computer-implemented steps of:
   generating an opportunity report comprising prioritized product cross sell opportunities for the target customer; and
   presenting the opportunity report to a user.

4. The method of claim 3 wherein the computer-implemented step of presenting the opportunity report to the user comprises displaying the opportunity report to a user on a computer user interface.

5. The method of claim 3 wherein in the computer-implemented step of presenting the opportunity report to the user comprises emailing the opportunity report to the user.

6. The method of claim 3, wherein the opportunity report comprises product cross-sell opportunities by product and dollar amount.

7. The method of claim 3, wherein the opportunity generator function further comprises computer-implemented instructions for generating an opportunity report that visually depicts product cross-sell opportunities, said computer-implemented instructions comprising computer code for:
   identifying normalized non-core customer and core customer spending for a product group as expected non-target customer spending for the product group;
   identifying target customer spending for the product group;
   calculating target customer cross-sell opportunity amounts for the target customer;
   displaying the product group, normalized non-core customer and core customer spending for the product group, the target customer spending for the product group and the target customer cross sell opportunity amounts; and
   repeating the steps of identifying normalized non-core customer and core customer spending, identifying target customer spending, calculating target customer cross sell opportunity amounts for the target customer.

8. The method of claim 7 wherein a display that is visually depicted comprises a plurality of bars representing normalized expected non-target spending for the product group, the target customer spending for the product group and the target customer cross sell opportunity amounts.

9. The method of claim 8 wherein the target customer cross sell opportunity amounts are identified as the difference between an expected spend for the target customer calculated from the normalized expected non-target customer spending and actual spending for the target customer.

10. The method of claim 1 wherein the target customer sales transaction data includes the amount of money the target customer spends on a product, and product cross-sell opportunities for the target customer are computed as the difference between target customer spending on the product and the benchmark spending model by product for the core customers in the clustered customer group.

11. The method of claim 1, wherein the clustering algorithm comprises an affinity propagation clustering algorithm.

12. The method of claim 1, wherein the clustering algorithm is selected from the group consisting of: affinity propagation algorithms, centroid models algorithms, hierarchical clustering algorithms and graph search algorithms.

13. The method of claim 1, wherein the clustered customer group product purchase pattern profile is stored in a parameter look up table for reuse in the step of generating product cross sell opportunities for the target customer.

14. The method of claim 13, wherein the parameter look up table comprises data selected from the group consisting of: customer minimum revenue, product, product group, date, time period and customer definition parameters.

15. The method of claim 13, wherein the parameter lookup table comprises opportunity identification parameters selected from the group consisting of: minimum opportunity amount and opportunity definition parameters.

16. The method of claim 13, wherein the parameter lookup table comprises sales campaign parameters.

17. A computer system comprising:
   a processor;
   a memory coupled to the processor;
   a display device;
   wherein the memory stores a program, that identifies product cross sell opportunities for a target customer to be presented to a business, when executed by the processor causes the processor to:
   download target customer data attributes and target product data for a target customer stored in memory;
   download target customer sales transaction data comprising historical sales transactions stored in memory for one or more products;
   download customer data stored in memory for a group of core customers wherein the customer data is selected from the group consisting of core customer data attributes, core customer product data, core customer product affinity data and core customer sales transaction data;
   compute a clustered customer group by grouping together customers from the group of core customers that have similar customer product purchase patterns;
   compute a benchmark spending model by product for the core customers within the clustered customer group to determine a clustered customer group purchase pattern profile;
   download non-core customer data stored in memory for a group of non-core customers wherein the non-core customer data is selected from the group consisting of non-core customer data attributes, non-core customer product data and non-core customer sales transaction data;
   compute a spending model by product for a non-core customer to determine a non-core customer product purchase pattern profile based on non-core customer data;
   normalize the non-core customer product purchase pattern profile by computing an expected non-core customer product spending based on the clustered customer group purchase pattern profile and adding the normalized non-core product purchase pattern profile to the clustered customer group purchase pattern profile;
   determine the differences between the clustered customer product purchase pattern profile and the target customer sales transaction data to compute cross sell opportunities for the target customer; and
   present product cross-sell opportunities for the target customer to the business.

18. The method of claim 17, wherein the product group comprises one or more products.

19. The method of claim 18 wherein a display that is visually depicted comprises a plurality of bars representing normalized expected non-target spending for the product, target customer spending for the product and cross sell opportunity amounts for the target customer.

20. A computer system comprising:
   a server with a computer processor;
   a memory coupled to the computer processor;
   a display device;
   wherein the memory stores a program, that identifies product cross sell opportunities for a target customer to be presented to a business, that when executed by the processor causes the processor to:

download target customer data attributes and target product data for a target customer stored in memory into the server;

download target customer sales transaction data comprising historical sales transactions for the target customer stored in the memory for one or more products into the server;

download customer data stored in the memory for a group of core customers into the server wherein the customer data is selected from the group consisting of core customer data attributes, core customer product data, core customer product affinity data and core customer sales transaction data;

group together customers from the group of core customers that have similar product purchase patterns to form a clustered customer group and correlating spending by product for core customers within the clustered customer group;

compute a benchmark spending model by product for the core customers within the clustered customer group to determine a clustered customer group product purchase pattern profile;

download non-core customer data stored in the memory for a group of non-core customers into the server wherein the non-core customer data is selected from the group consisting of non-core customer data attributes, non-core customer product data and non-core customer sales transaction data;

compute a non-core customer spending model by product for a non-core customer using the non-core customer data downloaded into the server to determine a non-core customer product purchase pattern profile;

normalize the non-core customer product purchase pattern profile by computing an expected non-core customer product spending based on the clustered customer group product purchase pattern profile, and adding the normalized non-core customer product purchase pattern profile to the clustered customer group purchase pattern profile; and determine the differences between the clustered customer group product purchase pattern profile and the target customer sales transaction data to generate product cross sell opportunities for the target customer.

* * * * *